Patented Feb. 23, 1932

1,846,139

UNITED STATES PATENT OFFICE

HEINRICH NERESHEIMER AND WILHELM SCHNEIDER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFF OF THE PYRAZOLANTHRONE SERIES

No Drawing. Application filed October 29, 1929, Serial No. 403,352, and in Germany November 13, 1928.

The present invention relates to a process of producing new vat dyestuffs containing nitrogen.

We have found that valuable new dyestuffs containing nitrogen are obtained by subjecting 2.N - pyrazolanthronyl - benzanthrones which have a negative substituent in the Bzl-position to alkaline condensation. The 2.N-pyrazolanthronyl-benzanthrones are obtainable, for example, by the condensation of pyrazolanthrone or its derivatives with 2-halogenbenzanthrones which contain another negative substituent in the Bzl-position. The products obtained probably correspond to the general formula:

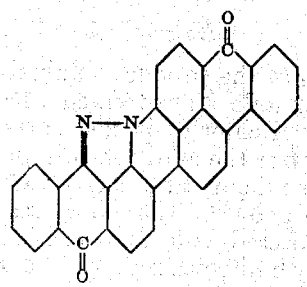

which may further be substituted. They dissolve in concentrated sulphuric acid to give from blue to bluish green solutions and dye cotton from blue to violet vats reddish violet to violet shades. For example, the dyestuff obtained by treatment of the condensation product of pyrazolanthrone and 2-chlor-Bzl-nitrobenzanthrone with alcoholic caustic potash solution dyes cotton clear reddish violet shades from a blue vat. Dyestuffs of other shades may be obtained by halogenating the products. The halogenation is preferably effected in organic solvents and in the presence of halogenating catalysts.

The following examples will further illustrate how the said invention may be carried out in practice, but the invention is not restricted to these examples. The parts are by weight.

Example 1

20 parts of 2.N-pyrazolanthronyl-Bzl-nitrobenzanthrone, obtainable by the condensation of 2-chlor-Bzl-nitrobenzanthrone with pyrazolanthrone, which crystallizes in pale brown leaflets from nitrobenzene and probably corresponds to the formula:

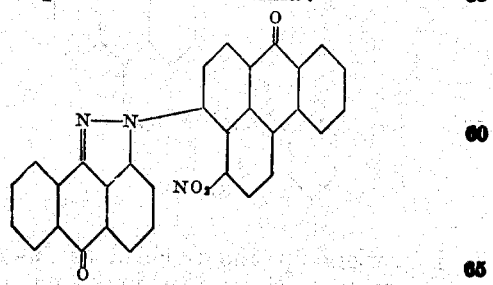

are introduced into a hot mixture of 200 parts of caustic potash and 200 parts of ethyl alcohol at 110° C. The whole is then stirred at this temperature until the formation of the dyestuff is complete. It probably corresponds to the formula:

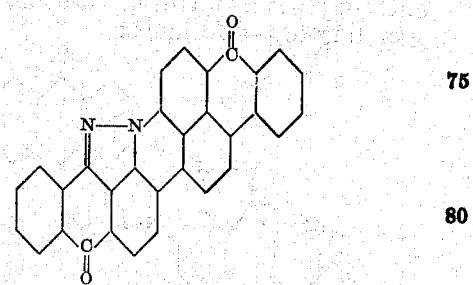

The dyestuff is worked up by pouring the melt into water and passing air into the alkaline liquid. When purified by crystallization from nitrobenzene or sulphuric acid, the dyestuff forms small bronze colored needles which dissolve in concentrated sulphuric acid giving a blue coloration. Cotton is dyed clear reddish violet shades from a blue vat.

Example 2

20 parts of 2.N-pyrazolanthronyl-6.Bzl-dichlorbenzanthrone obtainable by the condensation of pyrazolanthrone with 2.6.Bzl-trichlorbenzanthrone, obtainable by chlorinating 6.Bzl-dinitro-2-chlorbenzanthrone, which crystallizes in flat yellow leaflets from nitrobenzene and probably corresponds to the formula:

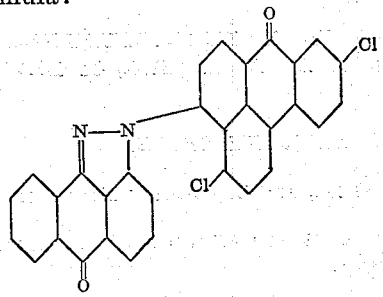

are treated with an ethyl alcoholic solution of caustic potash as described in Example 1, and the temperature is preferably raised to 140° C. The dyestuff which probably corresponds to the formula:

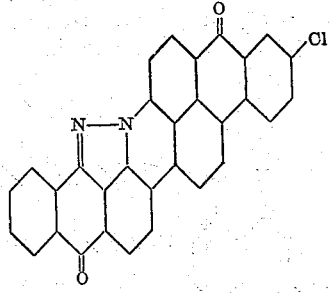

is worked up and purified as described in Example 1. It dissolves in concentrated sulphuric acid giving a bluish green coloration. Cotton is dyed violet shades from a violet vat.

Example 3

20 parts of 2.N-4'-benzoylaminopyrazolanthronyl - Bzl - nitrobenzanthrone corresponding to the formula:

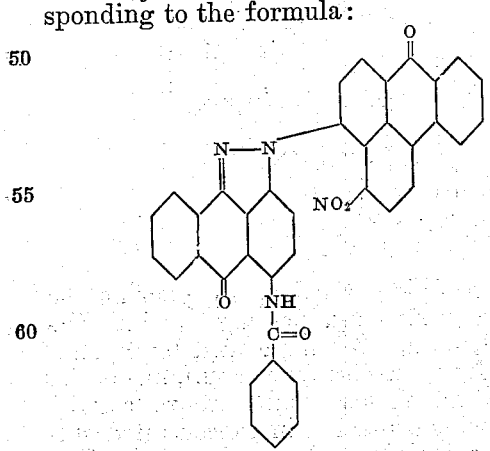

are introduced at from 120° to 125° C. into a mixture of 200 parts of caustic potash and 200 parts of ethyl alcohol. The initial material is obtained for example by the condensation of 2-chlor-Bzl-nitrobenzanthrone with 4-benzoylaminopyrazolanthrone, obtainable by treating 1-chlor-4-benzoylaminoanthraquinone with hydrazin hydrate, crystallizing in yellow brown leaflets from trichlorbenzene and crystallizes from nitrobenzene in the form of yellow brown needles.

When the reaction is complete, the dyestuff is worked up as described in Example 1 and purified, for example, by crystallization from nitrobenzene. It probably corresponds to the formula:

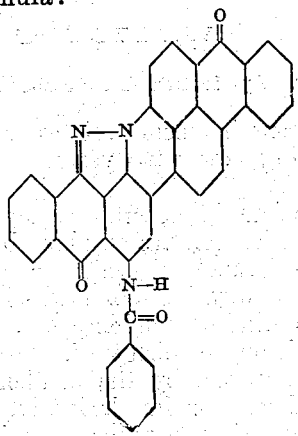

dissolves in concentrated sulphuric acid giving a blue coloration and dyes cotton violet shades from a violet vat.

Example 4

25 parts of the product obtainable according to Example 1 are treated with 37 parts of sulphuryl chloride in 250 parts of nitrobenzene, after the addition of 4 parts of pyridine, for 2 hours at about 50° C. and then for 1 hour at 60° C. The warm reaction mixture is filtered and the reaction product washed with nitrobenzene and benzene. The dyestuff made into a paste by usual methods dissolves in concentrated sulphuric acid to give a greenish blue solution and dyes cotton from a blue vat red violet shades.

What we claim is:—

1. The process of producing nitrogenous vat dyestuffs, which comprises treating a 2.N-pyrazolanthronylbenzanthrone containing a halogen or a nitro group in the Bzl-position with an alkaline condensing agent.

2. The process of producing nitrogenous vat dyestuffs, which comprises treating a 2.N-pyrazolanthronylbenzanthrone containing a halogen or a nitro group in the Bzl-position with an alcoholic caustic alkali melt.

3. The process of producing a nitrogenous vat dyestuff, which comprises treating 2.N-pyrazolanthronyl - Bzl - nitrobenzanthrone with an alcoholic caustic potash melt.

4. The process of producing nitrogenous vat dyestuffs which comprises treating a 2.N-pyrazolanthronylbenzanthrone, containing a halogen or a nitro group in the Bzl-position with an alkaline condensing agent and treating the condensation product with a halogenating agent.

5. As new articles of manufacture vat dyestuffs probably corresponding to the general formula:

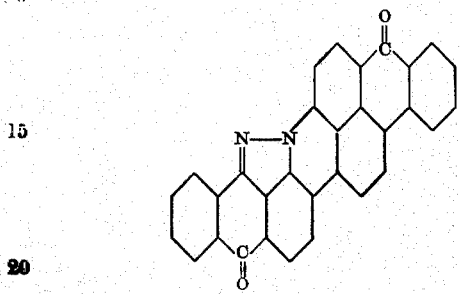

which may contain substituents of the group consisting of halogen and acylamino, the said dyestuffs dissolving in concentrated sulphuric acid to give from blue to bluish green solutions and dyeing cotton from reddish violet to violet shades from blue to violet vats.

6. As a new article of manufacture the vat dyestuff probably corresponding to the formula:

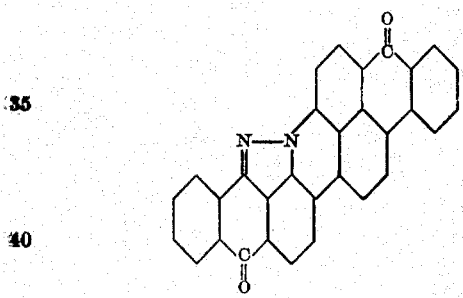

dissolving in concentrated sulphuric acid to give a blue solution and dyeing cotton from a blue vat reddish violet shades.

7. As a new article of manufacture, the vat dyestuff probably corresponding to the formula:

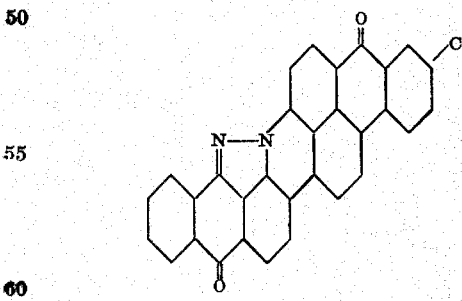

dissolving in concentrated sulfuric acid giving a bluish green coloration and dyeing cotton violet shades from a violet vat.

8. As a new article of manufacture, the vat dyestuff probably corresponding to the formula:

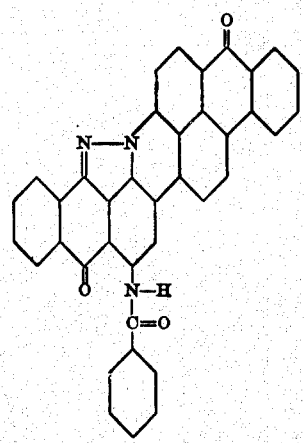
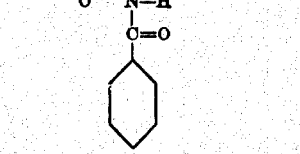

dissolving in concentrated sulfuric acid giving a blue coloration and dyeing cotton violet shades from a violet vat.

In testimony whereof we have hereunto set our hands.

HEINRICH NERESHEIMER.
WILHELM SCHNEIDER.